United States Patent [19]

Bentley et al.

[11] Patent Number: 4,751,255

[45] Date of Patent: Jun. 14, 1988

[54] POLYMERIC POLYAMINES

[75] Inventors: James M. Bentley, Tervuren; James P. Brown, Sterrebeek; Guy Frijns, Rixensart; David J. Sparrow, Tervuren, all of Belgium

[73] Assignee: Imperial Chemical Industries PLC, London, England

[21] Appl. No.: 27,956

[22] Filed: Mar. 19, 1987

[30] Foreign Application Priority Data

Mar. 26, 1986 [GB] United Kingdom ............... 8607597
Jun. 17, 1986 [GB] United Kingdom ............... 8614703

[51] Int. Cl.$^4$ .................................................. C08G 18/14
[52] U.S. Cl. ........................................ 521/163; 528/68; 528/76; 528/77; 528/335; 528/342; 528/347; 564/153; 564/155; 564/164

[58] Field of Search ............... 521/163; 528/68, 76, 528/77, 335, 342, 347; 564/153, 155, 164

[56] References Cited

U.S. PATENT DOCUMENTS 4,133,803  1/1979  Klein .................................. 528/335

Primary Examiner—Maurice J. Welsh
Attorney, Agent, or Firm—Cushman, Darby & Cushman

[57] ABSTRACT

The invention relates to a polymeric polyamine having a molecular weight of from 1000 to 16000 and containing from 2 to 4 primary amino groups per molecule, the polymeric polyamine being the condensation product of a polycarboxylic acid or ester with a stoichiometric excess of a polyamine having terminal aminopropoxy groups and a molecular weight below 500.

9 Claims, No Drawings

POLYMERIC POLYAMINES

This invention relates to polymeric polyamines and more particularly to polymers having primary amino terminal groups, to the preparation of such polymers and to their use in the production of macromolecular materials.

It is well known to manufacture polyurethane materials of a cellular or non-cellular, flexible or rigid nature by reacting organic polyisocyanates with polymeric polyols in the presence, where required, of other components such as foaming agents, cross-linking agents, catalysts and surfactants.

The rate of reaction between the polyisocyanate and the polyol can be controlled by the use of the aforementioned catalysts which may also serve to regulate the speed of this reaction relative to competing reactions, for example a foaming reaction. In some situations, however, the reactivity of polyols towards polyisocyanates is less than is desirable, especially where the polyol contains secondary hydroxyl groups as is usually the case in polyether polyols derived from propylene oxide.

It is known that isocyanates react more readily with primary amino groups than with hydroxyl groups and, accordingly, methods have been proposed for the preparation of amino-terminated polymers which, when reacted with organic polyisocyanates, are converted to macromolecular materials which contain polyurea linkages and have improved physical and chemical properties compared with the corresponding polyurethanes.

One method that has been proposed for making amino terminated polymers has been to react polyoxypropylene polyols with ammonia under such conditions that the 2-hydroxypropoxy end groups are converted to 2-aminopropoxy groups.

Another method that has been proposed is to react polyether polyols with acrylonitrile thereby introducing cyanoethoxy terminal groups which are converted by hydrogenation to 3-aminopropoxy groups.

These methods have been shown to be increasingly costly for polyoxypropylene polyols of increasing molecular weights which results in a disincentive to their use on a substantial scale.

It has now been found that useful primary amino ended polymer may be obtained by reacting polycarboxylic acids or derivatives thereof with aliphatic polyamines having terminal aminopropoxy groups.

Accordingly, the invention provides a polymeric polyamine having a molecular weight of from 1000 to 16000, preferably of from 1000 to 8000, and containing from 2 to 4 primary amino groups per molecule, said polyamine being the condensation product of a polycarboxylic acid and a stoichiometric excess of a polyamine having terminal aminopropoxy groups and a molecular weight below 500, preferably having a molecular weight of from 132 to 500.

The polymeric polyamines of the invention may be prepared by condensing one or more polycarboxylic acids or amide-forming derivatives thereof with one or more of the aforesaid polyamines having terminal aminopropoxy groups at temperatures up to 250 deg. Celsius. The molecular weights of the polycarboxylic acid and the polyamine and the amount of excess of polyamine are chosen in known manner to give a polymeric polyamine of the desired molecular weight. For example, polymeric diamines having molecular weights of about 2000 may be obtained by condensing two moles of a diamine of molecular weight 200 with one mole of a polymeric dicarboxylic acid of molecular weight 1800, by condensing seven moles of a diamine of molecular weight 200 with six moles of adipic acid or by several other diamine/dicarboxylic acid combinations which will be readily appreciated by a person skilled in the art. Similarly, the overall functionalities of the starting materials may be chosen in known manner to give polymeric polyamine products of the desired functionality.

Polyamines having terminal aminopropoxy groups which may be used in the preparation of the polymeric polyamines include polyamines in which the terminal groups are 3-aminopropoxy groups. Such polyamines may be obtained by cyanoethylating polyols followed by hydrogenation. Polyols which may be cyanoethylated include low molecular weight polyols, for example ethylene glycol, propylene glycol, diethylene glycol, 1,4-butanediol, 1,6-hexanediol, 1,4-cyclohexanedimethanol, 2,5-bis-hydroxymethylfuran, glycerol, trimethylolpropane, 1,2,6-hexanetriol and pentaerythritol residues as well as polyether polyols obtained by reacting such low molecular weight polyols with ethylene oxide and/or propylene oxide.

Further polyols which may be cyanoethylated include polyolefin polyols, such as hydroxy-terminated butanediene homo- and copolymers, polyacetal polyols, polyethioether polyols, polyhydroxylated natural oils, etc.

Mixtures of polyols may also be used, for example mixtures of polyols of different functionality. In this respect, it will be appreciated that the number of 3-aminopropoxy groups present in the polyamine after cyanoethylation and hydrogenation will correspond with the number of hydroxyl groups present in the starting polyol. Cyanoethylation and hydrogenation may be effected using prior art conditions. Thus, one or more polyols may be reacted with acrylonitrile at temperatures of from −20 to 10 degrees Celsius using 1 to 5, preferably 2 to 3, moles of acrylonitrile per hydroxyl group. After removal of unreacted acrylonitrile, hydrogenation may be carried out under standard conditions, for example using conventional hydrogenation catalysts.

Other polyamines having terminal aminopropoxy groups which may be used in the preparation of the polymeric polyamines include polyamines in which the terminal groups are 2-aminopropoxy groups. Such polyamines may be obtained by aminating polyols having two or more secondary hydroxyl groups. Polyols which may be aminated include dipropylene glycol, tripropylene glycol and other polyoxypropylene polyols. The number of 2-aminopropoxy groups present in the polyamine after termination will correspond with the number of secondary hydroxyl groups present in the polyol.

Polycarboxylic acids and amide-forming derivatives thereof which may be used in the preparation of the polymeric polyamines include aliphatic and aromatic dicarboxylic acids, for example succinic, glutaric, adipic, sebacic, phthalic and terephthalic acids and the di-lower alkyl, especially dimethyl, esters thereof. It is particularly convenient to use a commercially available mixture of the dimethyl esters of succinic, glutaric and adipic acids, for example a mixture in the approximate weight ratio 1:3:1. Other suitable polycarboxylic acids include polyesters having carboxylic acid or carboxylic acid ester end groups. Such polyesters are well known in the art and may be obtained by reacting one or more glycols, for example ethylene glycol, propylene glycol, diethylene glycol, 1,4-butanediol, 1,5-pentanediol or 1,6-hexanediol, cycloaliphatic glycols such as 1,4-cyclohexanedimethanol and 2,5 bis hydroxymethyl furan or araliphatic glycols such as bis hydroxyethoxybenzene with an excess, appropriate to the desired molecular weight, of one or more dicarboxylic acids or their anhydrides or lower alkyl esters. Suitable acids include the aliphatic and aromatic dicarboxylic acids mentioned above. The reaction mixture may also include minor amounts of higher functionality polyols such as glycerol, trimethylolpropane or pentaerythritol in order to produce polyols having more than two carboxylic acid or carboxylic acid ester groups per molecule. The polyesters suitably have molecular weights in the range 250 to 4000. A further class of suitable polycarboxylic acid derivatives includes polyethers having carboxyalkyl end groups. Such modified polyethers may be obtained by reacting a polyether polyol with an excess of a lower alkyl ester of a lower aliphatic dicarboxylic acid, for example a mixture of the dimethyl esters of succinic, glutaric and adipic acids. The modified polyethers suitably have molecular weights in the range 250 to 6000.

The invention provides polymeric polyamines having higher molecular weights than are readily obtainable by the cyanoethylation and hydrogenation route alone. Furthermore the presence of amide groups in the polymeric polyamines according to the invention results in properties which make them particularly appropriate for use in polyurea and polyurethane/urea systems.

It is therefore a further object of the invention to react the polymeric polyamines of the invention, optionally in admixture with polymeric polyols, for example polyether or polyester polyols, with organic polyisocyanates and diamine chain extenders, to form useful polyurea or polyurea/polyurethane products which may have a cellular or non-cellular structure. Suitable polyisocyanates include aromatic diisocyanates, for example tolylene diisocyanate and diphenylmethane diisocyanate which may be used as pure compounds, for example 4,4'-diphenylmethane diisocyanate, or isomer mixtures, for example mixtures of 4,4' and 2,4'-diphenylmethane diisocyanates or as unrefined products, for example products containing diphenylmethane diisocyanate isomers and oligomers (crude MDI).

Preferred chain extenders are in particular aromatic diamine chain extenders, such as 1-methyl-3,5-diethyl-2,4 diaminobenzene, 1-methyl-3,5 diethyl-2,6 diaminebenzene (both of these materials are also called diethyltoluene diamine or DETDA), 1,3,5-triethyl-2,6 diaminobenzene, 3,5,3',5'-tetraethyl-4,4" diaminodiphenylmethane and the like. Particularly preferred aromatic diamine chain extenders are 1-methyl-3,5-diethyl-2,4 diaminibenzene or a mixture of this compound with 1-methyl-3,5-diethyl-2,6 diaminobenzene.

The reaction between the polyamine and the polyisocyanate with the inclusion, where appropriate, of foaming agents, catalysts, surfactants, chain-extenders, flame-retardants, fillers, pigments etc. may be performed so as to produce solid elastomers, microcellular elastomers, flexible foams and other useful products. Known polyurethane techniques, for example reaction injection moulding, may be used.

The invention is illustrated but not limited by the following examples.

PREPARATION OF POLYMERIC POLYAMINES

Example 1

A glass reactor vessel, equipped with a nitrogen sparge, vigreux column and condensor, was charged with 2389 g of an aminated polyoxypropylene glycol sold by Texaco Co under the name Jeffamine D400 (Jeffamine is a trade name belonging to Texaco Co), 730 g of a 1:3:1 mixture of dimethyl adipate, glutarate and succinate. Catalyst was added to a concentration of 6 ppm. The reaction mixture was heated to 230 Deg. C. for 8 hours during which time methanol was collected at the condensor. At the end of this time the product was cooled and discharged from the reactor.

Product characterization

| | |
|---|---|
| Amine value | $0.99 \times 10^{-3}$ moles/g |
| Acid value | 2.5 mg KOH/g |
| Methoxyl value | 0 |
| Viscosity | 560 poise at 25 Deg. C. |

Example 2

In the manner described in example 1, employing 2565 g of an aminated polyoxypropylene glycol sold by Texaco Co under the name Jeffamine D400 (Jeffamine is a trade name belonging to Texaco Co.), and 935 g of dimethylterephthalate, a polymeric polyamine having the following properties was obtained.

| | |
|---|---|
| Amine value | $1.15 \times 10^{-3}$ moles/g |
| Acid value | >20 mg KOH/g |
| Methoxyl value | 0 |
| Viscosity | 931 centistokes at 100 Deg. C. |

Example 3

In the manner described in example 1, employing 2647 g of Jeffamine D400, 278 g of dimethylterephthalate and 575 g of the same mixture of dimethyl adipate, glutarate and succinate stated in example 1, the product having the following properties, was obtained.

| | |
|---|---|
| Amine value | $1.00 \times 10^{-3}$ moles/g |
| Acid value | 7.2 mg KOH/g |
| Methoxyl value | 0 |
| Viscosity | 358 centistokes at 100 Deg. C. |

Example 4

In the manner described in example 1, employing 2741 g of Jeffamine D400 and 759 g of adipic acid, the product having the following properties, was obtained.

| | |
|---|---|
| Amine value | $1.00 \times 10^{-3}$ moles/g |
| Acid value | 2.25 mg KOH/g |
| Viscosity | 977 centistokes at 100 Deg. C. |

Example 5

In the manner described in example 1 employing 257.7 g of a diamine, obtained by cyanoethylating and reducing a polypropylene glycol having a molecular weight of 300, and 42.3 g of the mixture of dimethyl adipate, glutarate and succinate stated in example 1, a product having the following properties was obtained.

| Amine value | $1.05 \times 10^{-3}$ moles/g |
|---|---|
| Viscosity | 130 centipoise at 50 Deg. C. |

Preparation of polyurea polymer product

Example 6

80 kilograms of a polyisocyanate mixture consisting of 22.8 parts by weight of a MDI composition having a NCO content of 33,4%, marketed by Imperial Chemical Industries Ltd. as Suprasec ML (Suprasec is a trade mark), and of 6.5 parts by weight of a liquid MDI composition having a NCO content of 29%, marketed by Imperial Chemical Industries Ltd. as Suprasec VM 20-LF 168 (Suprasec is a trade name), were charged to one storage tank of a Admiral HTRRIM unit. 80 kilograms of a mixture of 15.6 parts by weight of DETDA and 55.1 parts by weight of the polymeric amine described in example 1, were charged to the other storage tank of the Admiral HTRRIM unit. The materials were slightly agitated and recirculated through the feed lines, return lines and mix-head under a $N_2$ blanket.

The materials were injected into a pre-heated mold (100 Deg. C.) at a throughput of 60 kg/min. Impingement pressures were adjusted for viscosity differences to give pressures of ca 2500 psi for both the isocyanate and iso-reactive streams. The injection ratio was so adjusted that the polimerizing composition had the following formulation:

| ML-component | 22.8% |
|---|---|
| LF 168-component | 6.5% |
| DETDA-component | 15.6% |
| polymeric amine of example 1 | 55.1% |

The shot time was ca. 0.33 second, and the material was removed from the mold 30 seconds after being injected. The obtained plaque was postcured at 325 Deg. F. for 30 minutes.

Example 7

The same general procedure as described in example 6, was applied, replacing the Suprasec VM 20-LF 168 component by a Suprasec VM 20-XI 208 component (Suprasec is a trade mark), which is a liquid MDI composition having a NCO content of 31%. A polymer plaque was made from the following formulation:

| ML-component | 27.6% |
|---|---|
| XI 208-component | 4.8% |
| DETDA-component | 17.5% |
| polymeric amine of example 1 | 50.0% |

We claim:

1. A polymeric polyamine having a molecular weight of from 1000 to 16000 and containing from 2 to 4 primary amino groups per molecule, said polymeric polyamine being the condensation product of a polycarboxylic acid and a stoichiometric excess of a polyamine having terminal aminopropoxy groups and a molecular weight below 500.

2. A polymeric polyamine according to claim 1 having a molecular weight of from 1000 to 8000.

3. A polyamine according to claim 1 wherein the polyamine having terminal aminopropxy groups has a molecular weight of from 132 to 500.

4. A polymeric polyamine according to claim 1 characterized in that it results from the condensation with a polyamine having terminal aminopropoxy groups being the hydrogenation product of a cyanoethylated polyol.

5. A polymeric polyamine according to claim 1 characterized in that it results from the condensation with a polyamine having terminal aminopropoxy groups obtained by the amination of a polyol having two or more secondary hydroxyl groups.

6. A polymeric polyamine according to claim 1 characterized in that it results from the condensation with a polycarbonxylic acid selected from succinic acid, glutaric acid, adipic acid or a mixture of two or more of said acids.

7. A polymeric polyamine according to claim 1 characterized in that it results from the condensation with a mixture of the dimethyl esters of succinic, glutaric and adipic acids in the approximately weight ration of 1:3:1.

8. A process for producing a polyurethane/polyurea of polyurea polymer product which is either cellular, micro-cellular or non-cellular, by the reaction of organic polyisocyanate, diamine chain extender and isocyanate-reactive polymer, optionally in the presence of suitable catalsys, blowing agents, further chain extenders, additives and auxiliaires, characterized in that at least a part of the isocyanate reactive polymer is a polymer is a polymeric polyamine having a molecular weight of from 1000 to 16,000 and containing from 2 to 4 primary amino groups per molecule, said polymeric polyamine being the condensation product of a polycarboxylic acid and a stoichiometric excess of a polyamine having terminal aminopropoxy groups and molecular weight below 500.

9. A process according to claim 8, characterized in that the diamine chain extender is an aromatic diamine.

* * * * *